(12) United States Patent
Jun et al.

(10) Patent No.: US 7,908,999 B2
(45) Date of Patent: Mar. 22, 2011

(54) TEAT RUBBER

(76) Inventors: Jakob Maier Jun, Tuerkheim (DE); Wilfried Hatzack, Tuerkheim (DE)

( * ) Notice: Subject to any disclaimer, the term of this patent is extended or adjusted under 35 U.S.C. 154(b) by 68 days.

(21) Appl. No.: 10/587,620

(22) PCT Filed: Jan. 27, 2005

(86) PCT No.: PCT/EP2005/000816
§ 371 (c)(1),
(2), (4) Date: May 8, 2007

(87) PCT Pub. No.: WO2005/070197
PCT Pub. Date: Aug. 4, 2005

(65) Prior Publication Data
US 2007/0245967 A1 Oct. 25, 2007

(30) Foreign Application Priority Data
Jan. 27, 2004 (DE) .......................... 10 2004 004 057

(51) Int. Cl.
*A01J 15/16* (2006.01)
(52) U.S. Cl. .................................................. 119/14.49
(58) Field of Classification Search ..... 119/14.47–14.49
See application file for complete search history.

(56) References Cited

U.S. PATENT DOCUMENTS

| | | | | |
|---|---|---|---|---|
| 1,256,792 A * | 2/1918 | Harner | ........................ | 119/14.47 |
| 1,430,191 A * | 9/1922 | Rutherford | ................. | 119/14.16 |
| 2,302,443 A * | 11/1942 | Hodsdon | ..................... | 119/14.53 |
| 2,320,229 A * | 5/1943 | Frost | ........................... | 119/14.49 |
| 2,574,063 A * | 11/1951 | Richwine | ................... | 119/14.49 |
| 2,744,496 A | 5/1956 | Roben | | |
| 3,308,788 A | 3/1967 | Noorlander | | |
| 4,572,106 A * | 2/1986 | Mills | ........................... | 119/14.47 |
| 4,610,220 A | 9/1986 | Goldberg et al. | | |
| 4,840,141 A * | 6/1989 | Marshall | ..................... | 119/14.47 |
| 4,936,254 A * | 6/1990 | Marshall | ..................... | 119/14.47 |
| 6,176,200 B1 | 1/2001 | Petterson | | |
| 6,308,656 B1 * | 10/2001 | Milbrath et al. | ........... | 119/14.47 |
| 2002/0198489 A1 * | 12/2002 | Silver et al. | ..................... | 604/74 |

FOREIGN PATENT DOCUMENTS

| | | |
|---|---|---|
| DE | L 22840 | 9/1955 |
| DE | 44 20 321 A1 | 12/1995 |
| DE | 196 35 719 A1 | 3/1998 |

(Continued)

OTHER PUBLICATIONS

International Search Report dated Jul. 13, 2005 (5 pages).

(Continued)

*Primary Examiner* — Rob Swiatek
*Assistant Examiner* — Kristen C Hayes
(74) *Attorney, Agent, or Firm* — Flynn, Theil, Boutell & Tanis, P.C.

(57) ABSTRACT

A teat rubber for use on a milking cup of a milking apparatus, is made up of a head part having provided thereon a sealing lip that forms an insertion opening for a teat, a holding edge for grasping a milking cup sleeve, a suction connecting piece connected to the head part as well as a planar teat bearing section which is formed on the sealing lip provided on the head part and which defines the insertion opening, characterized in that the teat rubber has an adhesion element that improves the adhesion between the teat and the teat rubber without affecting the milking process.

13 Claims, 12 Drawing Sheets

FOREIGN PATENT DOCUMENTS

| | | |
|---|---|---|
| DE | 199 49 151 A1 | 4/2001 |
| DE | 100 18 870 A1 | 10/2001 |
| DE | 100 36 644 A1 | 2/2002 |
| DE | 697 19 565 T2 | 12/2003 |
| EP | 0 347 004 | 12/1989 |
| EP | 430526 A1 * | 6/1991 |
| GB | 284 236 | 3/1929 |
| GB | 1 241 172 | 7/1971 |
| GB | 2107565 A * | 5/1983 |

OTHER PUBLICATIONS

German Patent Office Search Report dated Nov. 24, 2004 (3 pages).

* cited by examiner

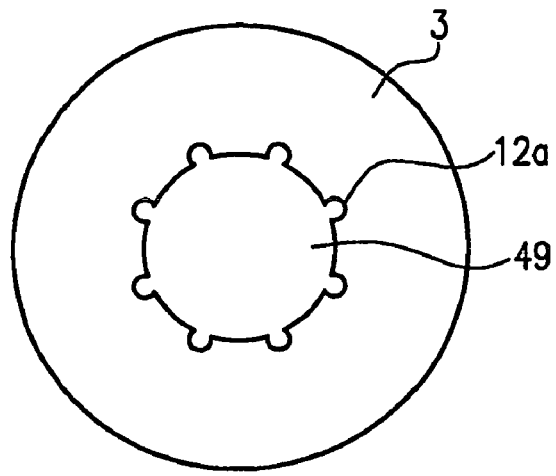
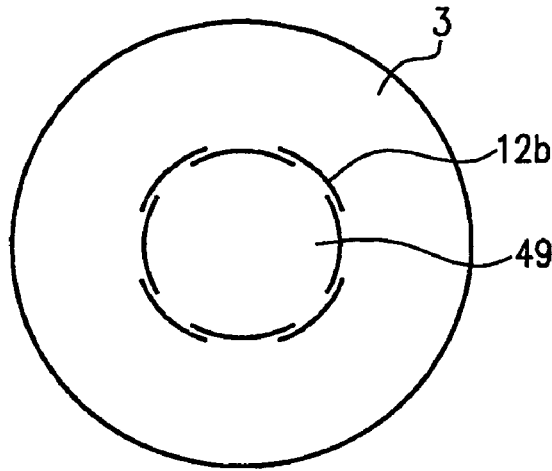
FIG.2a    FIG.2b
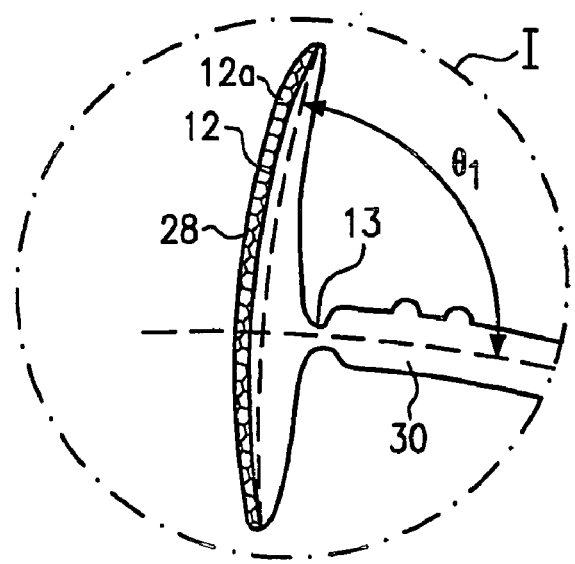
FIG.2c

TEAT RUBBER

FIELD OF THE INVENTION

The present invention relates to a teat rubber for use on a milking cup of a milking apparatus, comprising a head part having provided thereon a sealing lip that forms an insertion opening for a teat, a holding edge for grasping a milking cup sleeve, a suction connecting piece connected to the head part as well as a planar teat bearing section which is formed on the sealing lip provided on the head part and which defines the insertion opening.

DESCRIPTION OF THE RELATED ART

For mechanical milking, a milking unit is used, which essentially comprises a plurality of milking cups, a collection unit and suitable flexible connection lines for establishing fluid communication between the milking cups and the collection unit. The milk is sucked off from the collection unit through a central collection line and conducted into a central milk collection tank. The central collection line can have connected thereto a plurality of milking units, which are arranged in a so-called milking parlour.

In the following, reference will be made to FIG. 1, which illustrates the prior art.

In order to achieve a milking process that is as natural and as species-appropriate as possible, the milk is sucked off rhythmically and intermittently. The technical means allowing this is a milking unit including a milking cup which comprises a teat rubber A that is arranged in the interior of the milking cup sleeve B. The teat rubber A divides the interior of the milking cup into two areas so as to form a so-called two-chamber milking cup. The interior of the teat rubber A, in which the teat 190 is located and which represents one of the two areas, has applied thereto a vacuum or a suitable negative pressure so that the milk will be sucked off from the teat 190. The second area is implemented as a vacuum-tight cavity C between the teat rubber A and the milking cup sleeve B, said vacuum-tight cavity C having applied thereto atmospheric pressure and a negative pressure in turn. This vacuum-tight cavity C of the milking cup between the teat rubber A and the milking cup sleeve B is called pulsation chamber C. The teat rubber A carries out a rhythmically pulsating motion in the course of which the teat rubber A folds in or collapses, when a vacuum is applied to the interior of the teat rubber A and when atmospheric pressure prevails in the pulsation chamber C, and unfolds due to its inherent elasticity when a vacuum is applied to the pulsation chamber C. When the teat rubber A collapses, the flow of milk from the teat 190 is interrupted, in spite of the vacuum which is still applied to the teat 190, and, simultaneously, a massaging stimulus is exerted on the teat 190 so that a stagnation of blood circulation in the teat tissue will be prevented to a very large extent. The milk plug existing below the fold-in area when the teat rubber A collapses will then flow to the milk collecting unit, the flow speed of said milk plug being increased still further by the folding in of the teat rubber A.

The teat rubber A establishes a contact between the animal and the technical means. The shape, the material and the movement of the teat rubber A during the milking process essentially determine the success of the milking process. For example, the use of softer teat rubbers A will normally have a positive effect on a cow, and it has been found that a change of soft to harder teat rubbers A results, in the long run, in restrictions, i.e. in lower milk flow and in longer post-milking (i.e. the milk will only flow off in response to long massaging of the udder and the teats). If the teat rubber A is too small, the milk-discharge paths will be narrowed and high flows of milk will be prevented. If, however, a small teat is milked with an excessively large teat rubber A, the tissue will be overexpanded and break and an accretion of connective tissue will occur subsequently. The teats 190 become hard and the cows can be milked less easily.

Since the contact between the teat rubber A and the teat should be as gentle as possible, an additional problem frequently arises insofar as the teat rubber does not adhere to the teat in a sufficiently reliable manner. On the one hand, the pressure applied to the teat 190 by the teat rubber A and the negative pressure of the milking vacuum must not be excessively high, and, on the other hand, the milking cup must not fall off during the milking process.

Another circumstance has a disadvantageous effect on the automatic milking process. In the course of the milking process, the udder shrinks and the teats 190 are drawn deeper into the milking cup. The milking cup, so to speak, "climbs" along the teat 190, strangulates the teat 190 and bears against the so-called "Fuerstenberg'schen Venenring" (inner annular fold) 150 that is located on the upper end of the teat 190. If the inner annular fold 150 is strangulated by a milking cup that moved upwards along the teat, the blood circulation in the teats 190 will be impaired, and this is uncomfortable for the animal. The main problem, however, is that the flow of milk from the udder into the teat is severely constrained, which makes a fast, gentle and complete milk removal much more difficult. Also the animal's co-operation, which is one of the essential prerequisites for successful milking, decreases. In the long run, this will lead to an increasing inactivity of the milk-producing tissue.

For a livestock-friendly milk removal, which makes the animal feel good, it will therefore be advantageous, when, among other prerequisites, the prerequisite following hereinbelow is fulfilled.

The teat rubber must not strangulate the teat. In particular at the end of the milking process, the teat and the udder shrink and the milking cup moves upwards along the teat before the milk has been removed completely from the udder. The milk channels and the blood vessels are squeezed off and the flow of milk will cease. Hence, post-milking will be necessary. It follows that the teat rubber A must not strangulate the inner annular fold 150 and restrict the circulation of blood therethrough.

In addition, for an unhindered milking process, a good adhesion between the teat rubber A and the teat 190 is absolutely necessary, so that the milking cup will not fall off and so that a suitable negative pressure can be maintained for the milking process, as far as possible independently of the size and the shape of the teat 190.

DE 196 35 719 discloses a teat rubber of the type referred to at the beginning, which is characterized in that the wall of the head part is reinforced in an area located between the insertion opening for the teat and the transition to the holding edge, that the end of the suction connecting piece facing the insertion opening for the teat merges with the head part on the level of the reinforced area, that at least a subarea of the head part portion located between the reinforced area and the transition to the holding edge is implemented such that it is resiliently deformable with respect to the reinforced area, and that this head part portion, together with the end of the suction connecting piece facing the insertion opening for the teat, define a cavity between them. The structural design of this teat rubber has the effect that, in the course of the successive suction and relief phases, the milking cup will ascend and descend in the longitudinal direction of the teat; this leads to a relaxation of the muscles on the udder.

DE 199 49 151 discloses a teat rubber with a head part, said head part having an insertion opening for a teat. In addition, the teat rubber is provided with a connecting piece connected to the head part, and with a holder for fastening the teat rubber in a milking cup sleeve. The teat rubber is composed of at least a first and a second component, said first and second components being replaceably interconnected. A system which comprises a connecting piece and various head parts and which is adaptable to various teat sizes can be created in this way.

U.S. Pat. No. 2,744,496 discloses a teat rubber comprising a flexible lip which extends at right angles to the teat axis; said flexible lip expands and bends inwards, when the teat is inserted and the teat opening adapts itself automatically to the shape and the size of the teat.

DE 44 20 321 describes a teat rubber having, in the area of the insertion opening, a thin-walled, hose-shaped extension which prevents the teat rubber from climbing and from falling off. Due to the hose-shaped insertion opening, it is, however, very difficult to insert the teat.

DE 100 18 870 describes a teat rubber whose head part is implemented as an annular hose. The production of such a hose, i.e. of an almost closed cavity, requires higher effort and entails therefore higher costs.

SUMMARY OF THE INVENTION

It is the object of the present invention to provide a teat rubber which has improved properties with regard to natural and species-appropriate milking, which allows the teat rubber of the type specified at the beginning to be easily applied, which adheres well to the teat and which does not strangulate the inner annular fold (Fuerstenberg'schen Venenring).

This object is achieved by a teat rubber of the type specified at the beginning, which is characterized in that the teat rubber comprises an adhesion element that improves the adhesion between the teat (190) and the teat rubber without affecting the milking process.

In an embodiment, the adhesion element is realized by a pre-stressing element which exerts a radially effective force on the planar teat bearing section. By means of the elastic pre-stressing means, it is achieved that sufficient pressure will always be applied to the teat so that the sealing and holding function will be guaranteed.

In another embodiment, the pre-stressing element is implemented such that it is able to cause a reduction of the radius of the insertion opening. Additional pressure can thus be applied to the teat via the planar teat bearing section so that the adhesion between the teat rubber and the teat will be improved.

In a further embodiment, the pre-stressing element comprises an annular element. The annular element encompasses an area around the planar teat bearing section and produces the additional pressure in this way.

In a further embodiment, the annular element is produced from a resilient plastic material, preferably rubber, or from metal, preferably a spring steel. These materials are advantageous insofar as they are easy to process and insofar as they can have a high strength on the one hand and resilient properties on the other.

In still another embodiment, the annular element is arranged on an inner wall of a cavity in the head part of the teat rubber.

In a further embodiment, a boundary of the planar teat bearing section has formed thereon a first projection which is directed towards the cavity and which prevents the annular element from slipping off.

In a further embodiment, the inner wall of the cavity has formed thereon a second projection adjacent said first projection in such a way that the space between said first and second projections forms a groove which accommodates the annular element.

Said first and second projections bring the annular element to the desired pressure-exerting position.

In a further embodiment, the annular element is arranged on an outer wall of the head part of the teat rubber. The area via which the prestress of the annular element is transmitted to the resilient teat rubber can thus be enlarged. In addition, the annular element is more easily accessible.

In still another embodiment, the annular element is provided with a folding mechanism by means of which said annular element can be changed over between two cross-sections. The cross-section of the insertion opening can thus be varied such that the teat can easily be inserted and that sufficient adhesion and leak tightness will be achieved during milking.

In a further embodiment, the folding mechanism comprises hinge portions so that a subarea of the annular element can change between a folded and an unfolded condition, when pressure is radially applied to the annular element. Making use of this embodiment of the annular element, it is possible to simultaneously hold the milking cup and change the radius of the annular element with one hand. This will facilitate insertion of the teat in the teat rubber.

In a further embodiment, the outer wall of the head part comprises at least two depressions with different outer diameters in which the annular element can be arranged in a displaceable manner so that the cross-section of the insertion opening can be varied. The ring can thus be positioned at these two locations with the depressions which are provided in the head part and which have different outer diameters. The cross-section of the resilient insertion opening can be varied in this way, and adapted to various teat sizes in each individual case.

In another embodiment, the pre-stressing means comprises resilient lamellae which are arranged between the teat bearing section and the head part. A defined pressure can thus be applied to the teat.

In still another embodiment, the lamellae are arranged radially. This allows the application of a radially uniform pressure.

In another embodiment, the radially arranged lamellae are implemented such that they comprise a Y-shaped bifurcation in the radial direction. This will lead to a particularly uniform distribution of pressure.

In another embodiment, the subareas of the planar teat bearing section are movable in a radial direction. This allows an adaptation to various teat sizes.

By means of the planar teat bearing section, the pressure applied to the teat is reduced so as to protect the teat, and the adhesion and sealing properties are enhanced at the same time. The subareas that are movable relative to one another will improve the adaptability to various shapes and sizes of the teat. It is, for example, possible to expand the insertion opening, since an angle between the sealing lip and the planar teat bearing section, which defines an enlarged boundary, is variable. The shape and the opening angle of the teat insertion opening can thus be varied and implemented such that it will be more easily adaptable to various shapes of teats and directions of insertion. The teat can be introduced more easily.

In a further embodiment, subareas of the planar teat bearing section are therefore movable with respect to an angular position relative to the sealing lip. This allows an adaptation to various teat shapes.

In another embodiment, the movability of the subareas of the planar teat bearing section relative to one another and relative to the sealing lip is achieved by the use of a soft, resilient material. The use of this material will increase the animal's well-being during the milking process and a higher yield will be obtained.

In another embodiment, the elastic material is latex or silicone rubber. These materials exhibit a particularly high degree of adaptability and are, in addition, extremely skin friendly so that this will in particular improve the cow's well-being.

In another embodiment, the movability of the subareas of the planar teat bearing section is achieved by overlapping segments. This will improve the adaptability to various teat diameters, whereby the vacuum in the suction connecting piece will be sealed off from the surrounding air in a particularly effective manner.

In another embodiment, the above-mentioned segments are resiliently interconnected. This represents an alternative realization for the movability of the subareas of the planar teat bearing section in the case of which a particularly high variability of the insertion opening is achieved.

In another embodiment, the subareas of the planar teat bearing section are interconnected by a constriction and/or a portion of reduced material thickness, whereby the movability of the subareas relative to one another is achieved.

In another embodiment, the subareas of the planar teat bearing section are interconnected by a section whose material properties have been changed. This is another possibility of obtaining a movable connection between the enlarged boundary and the sealing lip.

In another embodiment, the subareas of the planar teat bearing section are interconnected through portions consisting of a material that is softer than the material of said subareas. A movable connection can be established e.g. by locally treating the sealing lip and/or the planar teat bearing section with plasticizers.

In another embodiment, the head part of the teat rubber has predetermined bending points, said predetermined bending points leading to a deformation of the head part, when a pressure difference between the pulsation chamber and the surroundings is generated. The inner surfaces of the teat rubber obtained by this structural design are particularly easy to clean.

In still another embodiment, the predetermined bending points are arranged such that the planar teat bearing section on the head part is adapted to be moved alternately towards and away from the pulsation chamber in accordance with a change of pressure. These predetermined bending points favour movements of the teat cup in vertical and lateral directions relative to the teat, whereby the teat and the udder will be massaged.

In another embodiment, the teat bearing section is releasably connected to the head part. This allows a replacement of the enlarged boundary e.g. by a boundary having a different diameter for better adaptation to other teat shapes.

In another embodiment, the releasable teat bearing section is implemented as a resilient formed part having a shape similar to that of a hollow cylinder and including in the outer surface thereof a circumferentially extending indentation which is adapted for engagement with the sealing lip. A reliably fixed, but nevertheless releasable enlarged boundary will be obtained in this way.

In a further embodiment, an inner width of the outer, circumferentially extending indentation exceeds the thickness of the sealing lip so that a movable connection can be established between the teat bearing section and the sealing lip. This has the effect that a wedge-shaped gap is formed between the sealing lip and the enlarged boundary, which is implemented as a resilient formed part having a shape similar to that of a hollow cylinder and including a circumferentially extending indentation in the outer surface thereof.

In still another embodiment, a part of the insertion opening has a conically tapering surface, which conically tapers towards the inner side of the teat rubber in such a way that the inner annular fold (Fuerstenberg'sche Venenring) (150) located on the upper end, i.e. the base of the teat cannot come into contact with the teat rubber, and that pressure cannot be applied thereto, not even if the milking cup should shift in the direction of the udder. Furthermore, an effect will be produced in the case of which the lower edges of the planar teat bearing section move towards the teat, when the teat rubber slips inadvertently downwards and off the teat. The insertion opening will thus become narrower and the adhesion between the teat rubber and the teat will improve. These advantages will make it possible to solve, in combination with this feature, the above-mentioned problems by a teat rubber of the type specified at the beginning.

In another embodiment, the boundary of a wide opening of the conically tapering insertion opening is followed by an udder bearing surface by means of which the teat with the inner annular fold or with parts of the udder can be prevented from being drawn into the teat rubber by a milking vacuum, when the udder shrinks during the milking process, so that said inner annular fold cannot enter the narrow, pressure-exerting area of the teat rubber.

Another embodiment specifies that, when seen in a cross-sectional view, a conically tapering surface of the conically tapering insertion opening is concave, convex or linear.

In another embodiment, a transition between the conically tapering surface and the planar teat bearing section and the udder bearing surface, respectively, is implemented in a hingelike manner. The hinges will intensify an effect of the conically tapering surface in the case of which the lower edges of the planar teat bearing section move towards the teat, when the teat rubber slips inadvertently downwards and off the teat. The insertion opening will thus become narrower and the adhesion between the teat rubber and the teat will improve.

In another embodiment, the hingelike transition between the conically tapering surface and the planar teat bearing section and the udder bearing surface, respectively, comprises a portion of reduced material thickness, an indentation or a variation of the material properties in comparison with the properties of the adjoining material, so that the transition will assume hingelike properties.

In another embodiment, at least a part of the planar teat bearing section and/or of the inner surfaces of the suction connecting piece has cushioned surfaces. The teat contact areas of the teat rubber will thus encompass the teat in a particularly gentle manner and a more natural milking process will be achieved.

In still another embodiment, the cushioned surface consists of a foamed elastomer. This leads to an advantageous change of the resilient properties of the elastomer for the milking process and to a reduction of weight.

In still another embodiment, the foamed elastomer is a foam silicone. Silicone is known to be particularly skin friendly and, due to the foaming, the resilient properties of said material will be improved and the weight will be reduced.

In another embodiment, the foamed elastomer is sprayed onto the surface of the component in question.

In another embodiment, the whole planar teat bearing section and/or the suction connecting piece consist of the foamed elastomer.

The two last-mentioned embodiments are alternative embodiments that can be chosen depending on whether an optimized weight or a higher stability is to be achieved. However, hybrid forms are imaginable as well, in the case of which the parts of the teat rubber which are subjected to particularly high stress are implemented such that an optimum durability will be achieved, i.e. as non-foamed components, and the parts that are in intensive contact with the skin and subjected to little stress are implemented as skin-friendly and weight-optimized, i.e. foamed components.

In still another embodiment, the cushioned surfaces are implemented as cushioned pockets. The term pocket stands here for areas which are raised relative to the adjoining areas. Such pockets will be advantageous, when a particularly thick cushion is to be provided on the teat bearing surfaces alone, without impairing the stability and the durability.

Alternatively to or in combination with the foamed pockets, the cushioned surfaces are implemented as a fluid-filled pad, in particular as a gas-filled pad. A gas-filled pad has the advantage that the size and the resistance of the pad can be adjusted by varying the pressure. This will improve the flexibility in the case of different teat sizes.

In still another embodiment, the cushioned pocket or the fluid-filled pad is a replaceable insert. The cushioned pocket or the gas-filled pad can thus be replaced easily, if the pad/cushion should be damaged. Furthermore, pads/cushions of different sizes can be used, depending on the respective teat size; this will increase the flexibility of the system. The replaceable insert can again by implemented as an annular component and with a suitable elasticity, so as to improve the adhesion of the teat rubber.

It should be pointed out that the above-mentioned features can be combined, individually or in combination, with a teat rubber of the type specified at the beginning.

BRIEF DESCRIPTION OF THE DRAWINGS

In the following, preferred embodiments of the present invention will exemplarily be explained and described in detail, with reference to the accompanying drawings, in which:

FIG. 2a shows a top view of a teat rubber according to FIG. 2;

FIG. 2b shows a top view of a further embodiment of the enlarged boundary of the insertion opening of a teat rubber according to FIG. 2;

FIG. 2c shows a detail of the teat rubber in which an angular position of the planar teat bearing section relative to the sealing lip is illustrated;

FIG. 6a shows the pre-stressing element at a first position.

DETAILED DESCRIPTION OF THE INVENTION

Figure 2:
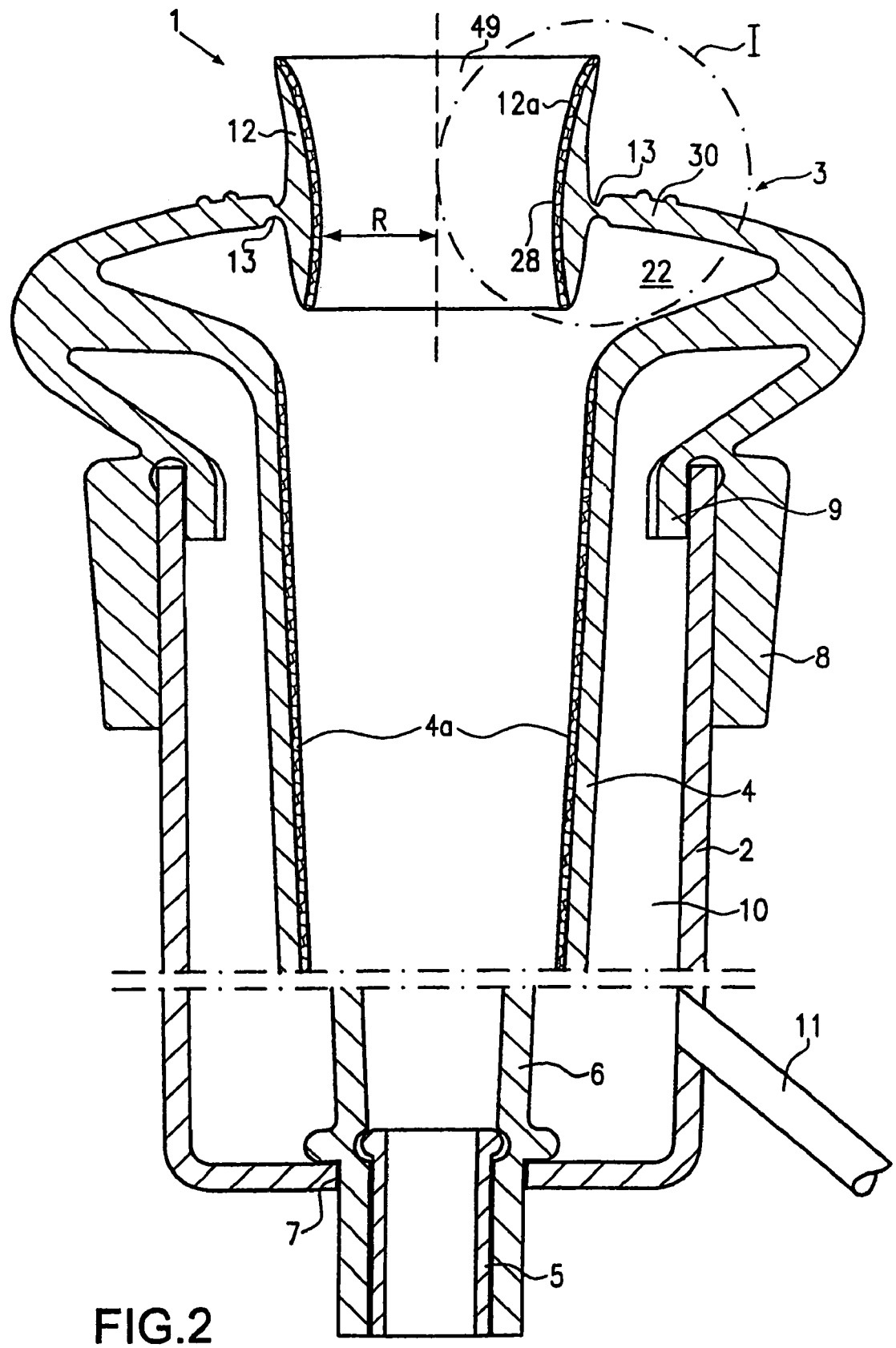
FIG. 2 shows a sectional view of an embodiment of a teat rubber according to the present invention.

FIG. 2 shows a teat rubber 1 according to the present invention, which is mounted on a milking cup sleeve 2 so as to form a so-called milking cup. The teat rubber 1 consists substantially of an upper head part 3 and a suction connecting piece 4 whose upper end is connected to the head part 3 and whose lower end 6 is clamped in a lower opening 7 of the milking cup sleeve 2 with the aid of a connection sleeve 5. The teat rubber 1 additionally comprises a holding edge 8 with which it grasps the upper end of the milking cup sleeve 2. In so doing, it attaches itself to the outer side of the milking cup sleeve 2. For providing additional support, a holding edge part, designated by reference numeral 9, can also abut on the inner side of the milking cup sleeve, as shown in the present example. The teat rubber 1 has on the upper end thereof an opening 49 enclosed by a sealing lip 30 through which the teat of the animal to be milked is inserted. Between the inner side of the milking cup sleeve 2 and the outer side of the suction connecting piece 4 a so-called pulsation chamber 10 is formed that communicates via a connecting piece 11 with a pulsator (not shown) which, when in operation, generates in the pulsation chamber 10 a vacuum or negative pressure and an atmospheric pressure in turn. The teat rubber 1 itself is normally implemented such that it is rotationally symmetric with respect to its longitudinal axis. Triangular, quadrangular, elliptically-shaped or corrugated cross-sections, in particular in the suction connecting piece 4, can, however, be used as well.

Furthermore, a planar teat bearing section 28 defines an enlarged boundary 12 of the insertion opening 49 so that the enlarged boundary 12 can be in planar contact with a teat via a teat bearing section 28. The enlarged boundary 12 is connected to the sealing lip 30, the connection being provided with an indentation 13. The indentation 13 makes the enlarged boundary 12 flexible so that the shape and the direction of the opening 49 can change when the teat is being inserted. This also means that the angle between the area of the enlarged boundary 12 and the sealing lip 30 becomes variable and that the insertion opening 49 can be expanded.

The flexible connection 13 can be realized by an indentation/portion of reduced material thickness or by a special treatment of the material, e.g. by special plasticizers.

The teat rubber 1 and the enlarged boundary 12 are produced from a flexible and skin-friendly material, preferably rubber, latex, silicone or a polymer material.

In order to be able to establish a particularly skin friendly contact between the teat and the teat rubber, parts of the teat bearing areas 12a, 12b, 4a, in particular the planar teat bearing section 28 and/or inner surfaces of the suction connecting piece 4, can be cushioned. It is, however, also possible to produce the whole teat rubber from a particularly soft material, e.g. foam silicone, which serves as cushioning.

The cushioned surface can consist of a foamed elastomer, in particular a foam silicone. The foamed elastomer can be produced in a two-component process. In such a process, a first component, which can flow to the places where it is required, is applied in a first step. Subsequently, e.g. the second component can be applied by spraying, whereupon the foam will form.

In the embodiment shown in FIG. 2, the foamed elastomer is sprayed onto the surfaces of the areas 4a and 12a. It is, however, also possible that the whole planar teat bearing section 28 and/or the suction connecting piece 4 consist of the foamed elastomer. The cushioned surfaces may also be implemented as cushioned pockets. The term pocket stands here for areas which are raised relative to the adjoining areas.

Alternatively to or in combination with the foamed pockets, the cushioned surfaces can be implemented as pads filled with a fluid, in particular with gas. A gas-filled pad has the advantage that the size and the resistance of the pad can be adjusted by varying the pressure which can possibly be adjusted automatically by means of pumps and pressure sensors.

Furthermore, the cushioned pocket or the gas-filled pad can be implemented as replaceable inserts.

The mode of operation of the teat rubber 1 is as follows:

the teat is inserted into the teat rubber 1 through the insertion opening 49. The sealing lip 30 prevents an ingress of air into the suction connecting piece 4 which has inserted therein the teat during the milking process. The enlarged boundary 12 has the effect that the insertion opening 49 terminates on the teat not in the form of a point, but in the form of an area. The pressure acting on the teat is thus distributed over a larger area, whereby a constriction of the teat will be prevented. In addition, the vacuum in the teat rubber 1 will be sealed more effectively and pressure losses will be reduced or avoided. The adhesion between the teat rubber 1 and the teat will be improved and less vacuum power will be required. In view of the reduced vacuum and the higher friction of the larger sealing surface, an upward motion of the milking cup along the teat during milking out can be reduced as well. The udder can thus be milked out more completely.

During the milking process, in the course of which a milking vacuum is applied to the interior of the suction connecting piece and thus to the area below the lower end of the teat, also a suction chamber 22 in the upper portion of the head part is approximately under vacuum. This pressure in the suction chamber 22 does virtually not change during the milking process.

Figure 1:
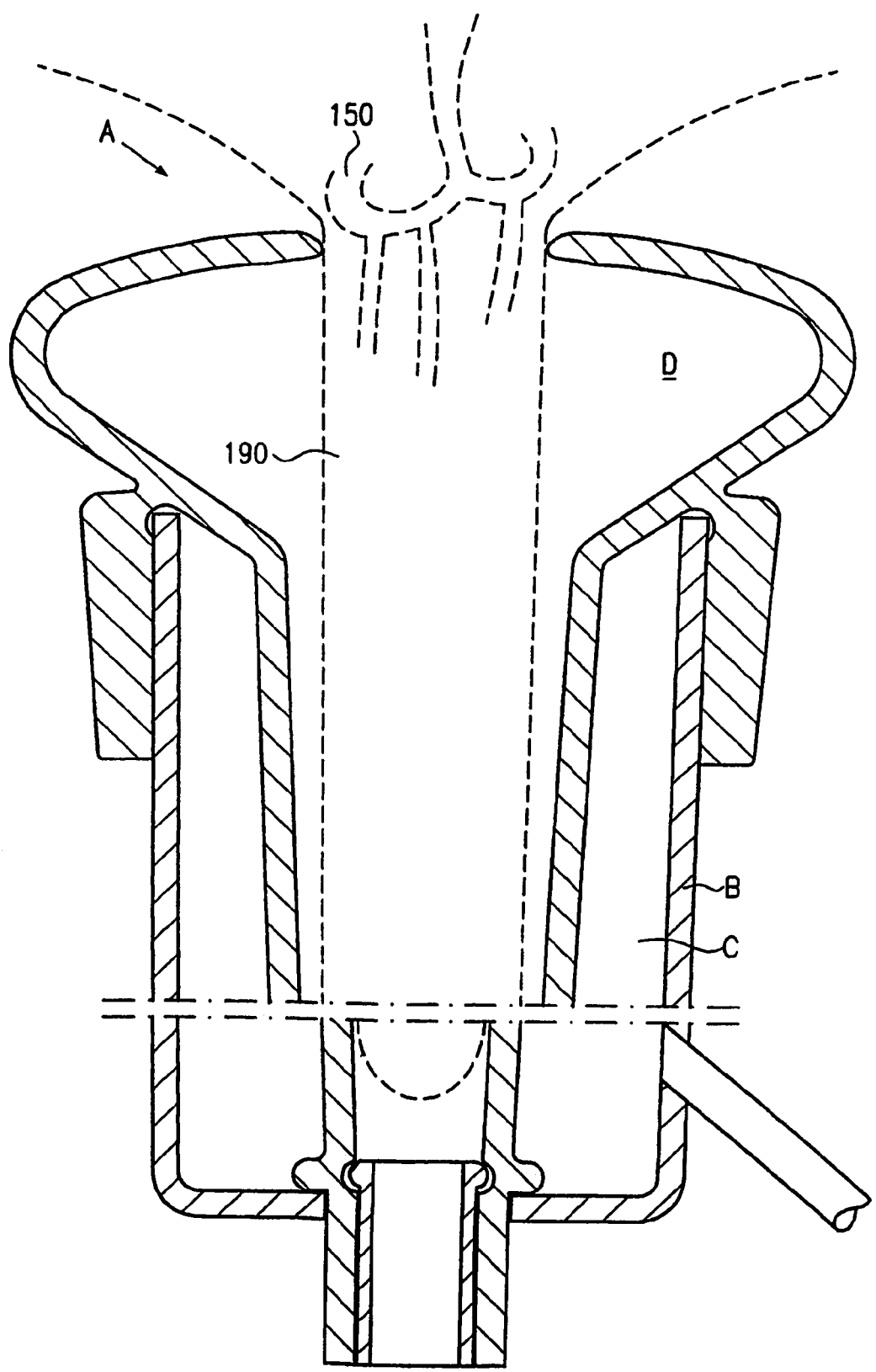
FIG. 1 shows a sectional view of a teat rubber according to the prior art.

Normally, milking is executed by means of a pulsed operation, i.e. in a so-called suction phase, in which milk is sucked from the teat by the vacuum applied to the area below the teat, a suitable vacuum or negative pressure is applied to the pulsation chamber 10 via a conduit 11. This has the effect that the suction connecting piece 4 assumes the cylindrical shape shown in FIG. 1. In the subsequent relief phase, the pressure in the pulsation chamber 10 is increased, typically to atmospheric pressure, while a vacuum or negative pressure is maintained in the interior of the suction connecting piece. This has the effect that, due to the different pressures acting on the two sides of the suction connecting piece 4, said suction connecting piece 4 is compressed below the teat so that further milk cannot be sucked from the teat. At the same time, the top of the teat is massaged.

Due to the larger area of the teat bearing section 28 on the teat insertion opening 49 that comes into contact with the outer surface of the teat, a higher frictional force will be generated under the same vacuum conditions, said higher frictional force preventing the milking cup from disengaging from the teat. The larger area will simultaneously increase the sealing effect and reduce the vacuum losses. All this allows a reduction of the milking vacuum while the milking performance and the adhesion between the milking cup and the teat will remain the same. Due to the lower vacuum, it will even be possible to increase the milking performance, since a lower, constant vacuum will be more pleasant for the animals and it will reduce the stress on them.

FIG. 2a illustrates an embodiment of the enlarged boundary 12a in a top view. In the case of this embodiment the enlarged boundary is subdivided into segments which are resiliently interconnected. This will increase the expansibility of the insertion opening during insertion of the teat.

FIG. 2b shows in a further embodiment of the enlarged boundary an enlarged boundary 12b, which is subdivided into segments that overlap. Also this will improve the expansibility of the insertion opening during insertion of the teat.

FIG. 2c shows a detail I of the teat rubber 1 in which an angular position $\Theta 1$ of the planar teat bearing area 28 relative to the sealing lip 30 is illustrated. Due to the indentation 13, the angular position $\Theta 1$ can easily be changed so that the planar teat bearing area 28 can be adapted more easily to various conditions, such as teat size and shape, and so that the teat can be inserted more easily.

In the following, further embodiments of the present invention will be described.

Features in the embodiments according to FIGS. 2, 3, 4 and 5, which correspond to features in the embodiment according to FIG. 2, have been provided with the same reference numerals, augmented by 100 (FIG. 3), 200 (FIG. 4), 300 (FIG. 5), 400 (FIG. 6), etc. Materials and modes of operation of features with such reference numerals are analogous, unless a difference is pointed out in the description.

Figure 3:
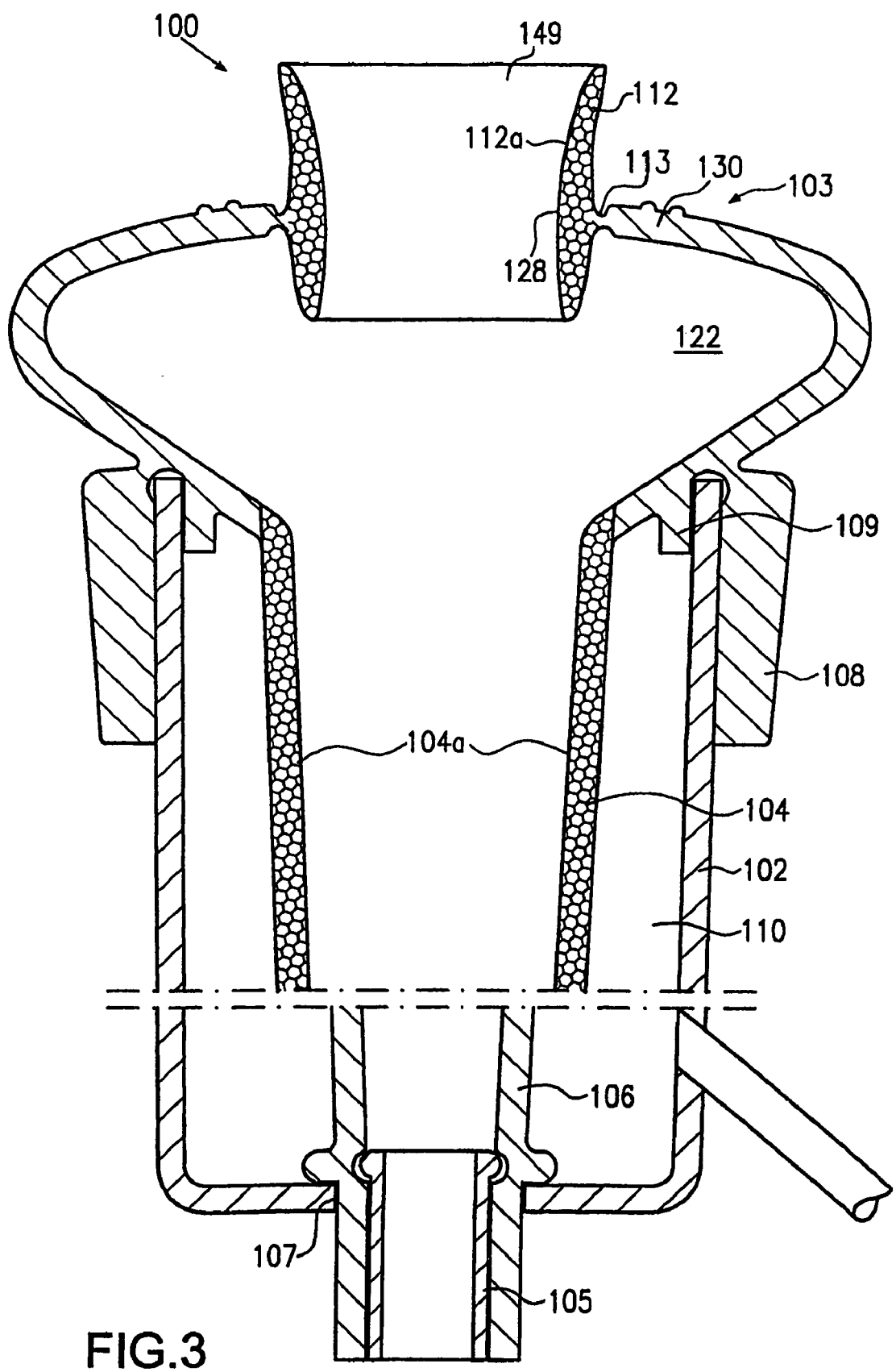
FIG. 3 shows a sectional view of a further embodiment of a teat rubber according to the present invention having an enlarged head volume.

In FIG. 3 an embodiment corresponding to that of FIG. 2 is shown, but the pulsation chamber 110 extends almost up to the upper edge of the milking cup sleeve 102. This increases the size of the cavity 122 within the head part 103 of the teat rubber, whereby the radius of curvature of the inner surface of the cavity 122 will be enlarged and cleaning of the teat rubber will be facilitated. Furthermore, a higher elastic flexibility of the head part with an improved massage and stimulation effect will be achieved. The adaptability to various teat sizes is improved as well.

As has already been described in FIG. 2, the teat bearing areas 112a, 104a can be cushioned in the embodiments that have already been described. FIG. 3 shows a fully foamed variant of the bearing areas 112a, 104a.

Figure 4:
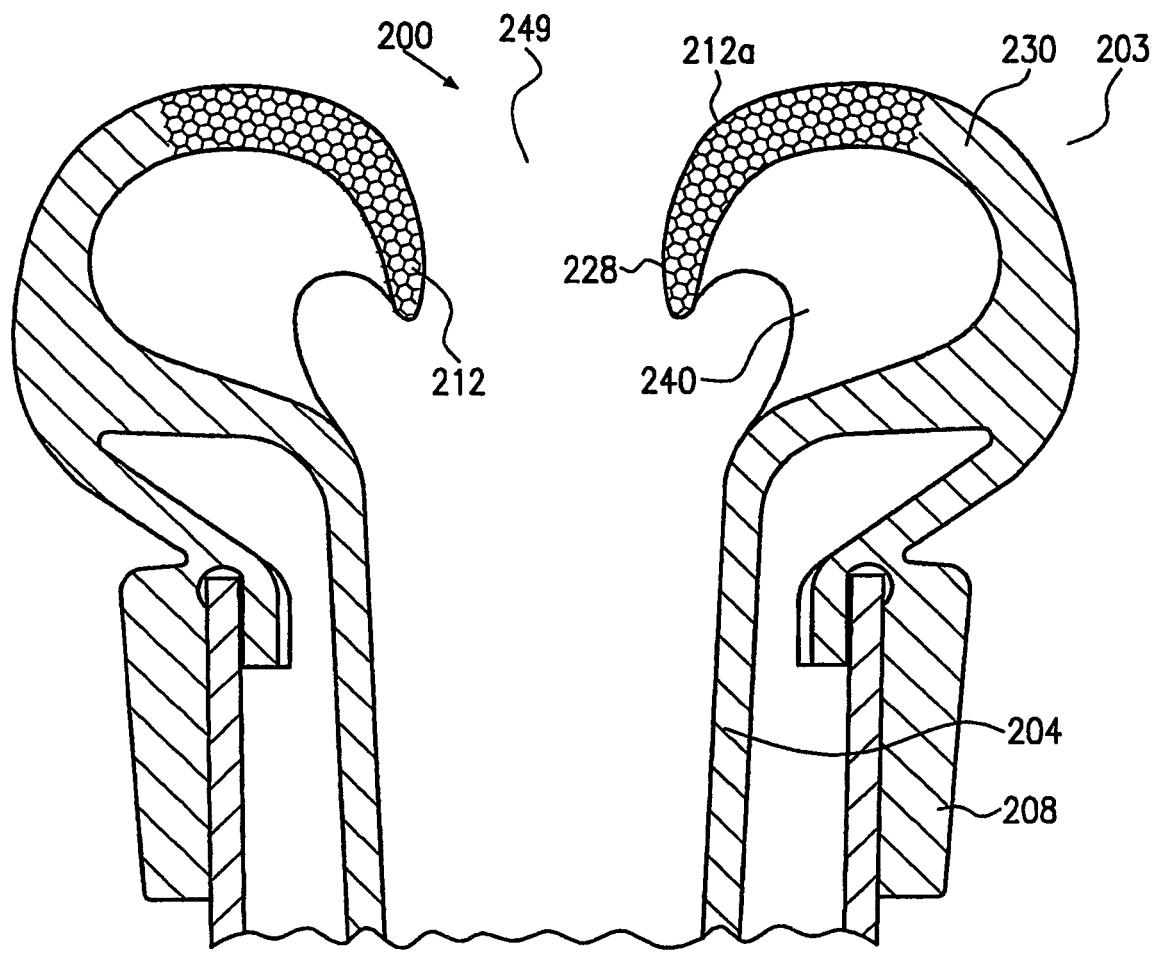
FIG. 4 shows a sectional view of a further embodiment of the present invention with lamellae as pre-stressing means.
Figure 4A:
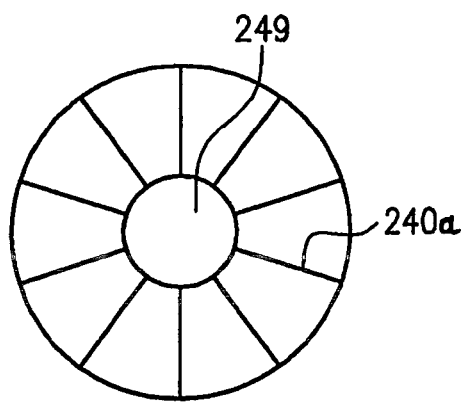
FIG. 4a shows a sectional top view of an embodiment according to FIG. 4.
Figure 4B:
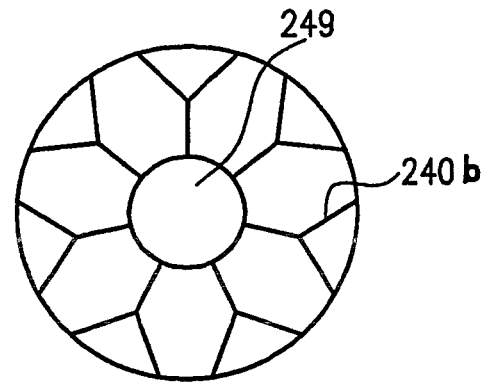
FIG. 4b shows a sectional top view of another embodiment according to FIG. 4.

FIG. 4 shows an embodiment having lamellae 240 in the head part so that a restoring force will be generated in response to a deformation of the planar bearing section 228. The lamellae can extend radially (FIG. 4a) or they may comprise a Y-shaped bifurcation (FIG. 4b) so that the restoring force will act more uniformly.

As has already been described in FIG. 2, the teat bearing areas 212a can again be cushioned in the embodiments that have already been described. FIG. 4 shows a fully foamed variant of the bearing areas 212a.

Figure 5:
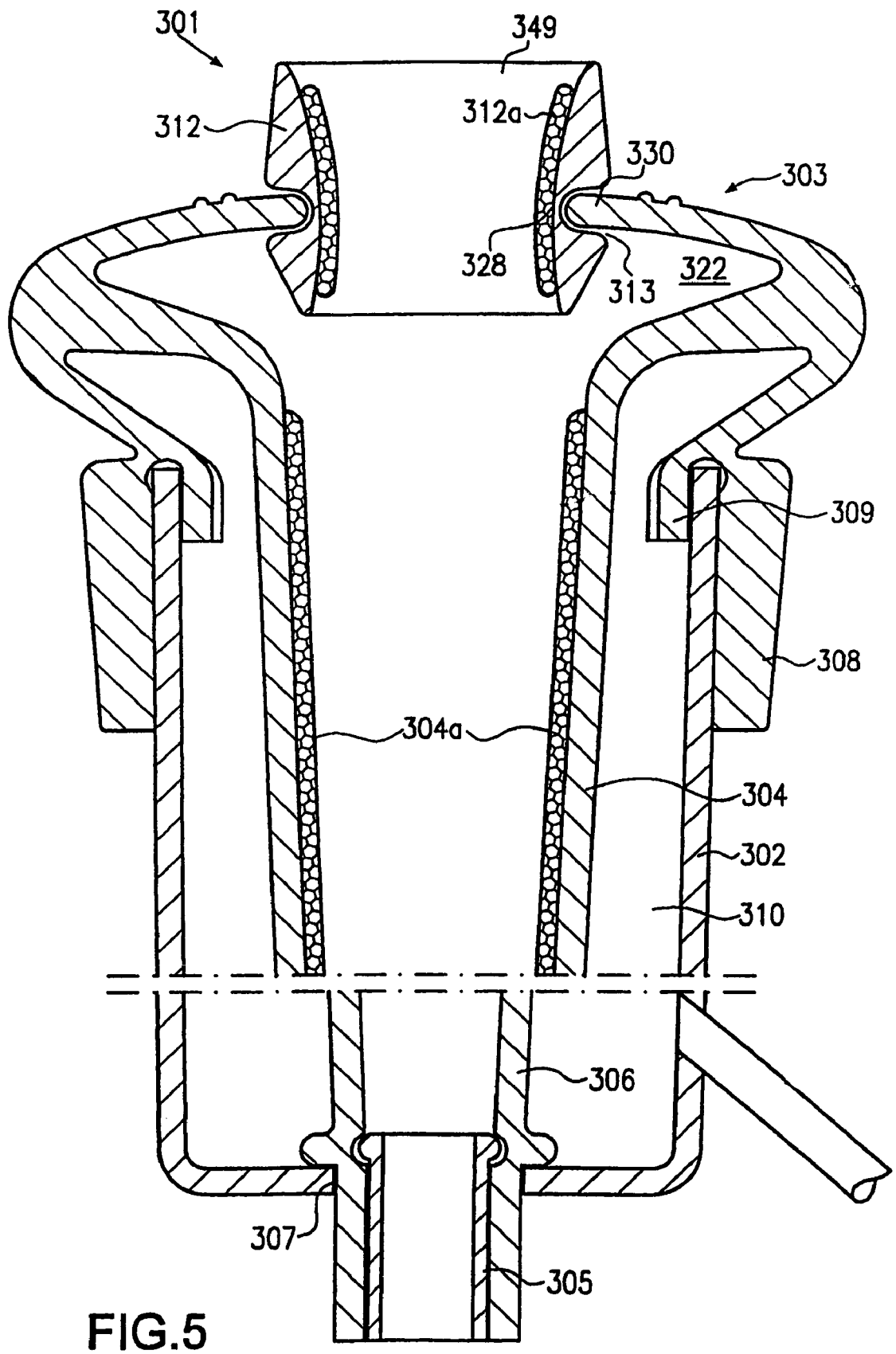
FIG. 5 shows a sectional view of a further embodiment of the present invention with a reversible connection between the enlarged boundary and the head part.

FIG. 5 shows another advantageous further development of the embodiment shown in FIG. 2, the enlarged boundary 312 being here removable. The enlarged boundary 312 is implemented as a rotationally symmetric part provided with a groove 313 which circumferentially extends in the outer surface of said part and which is implemented such that the enlarged boundary 312, which is implemented as a separate component, can be brought into engagement with the head part 303 and remains movable in said position of engagement. This can be achieved by dimensioning the diameter of the groove 313 such that it is slightly larger than the thickness of the sealing lip 330. This leads to a formation of wedge-shaped incisions at the connection between the sealing lip and the enlarged boundary, whereby the connection will be rendered flexible. This, in turn, means that the angle between the surface of the enlarged boundary 312 and the sealing lip 330 will be rendered variable and that the insertion opening 349 can be expanded.

Reference should be made to the fact that the enlarged boundary need not be implemented as a rotationally symmetric part. Polygonal cross-sectional areas are possible as well.

As has already been described in FIG. 2, the teat bearing areas 312a, 304a can be cushioned in the embodiments that have already been described. FIG. 5 shows a cushioning of the bearing areas 312a, 304a, which is implemented as a pad/pocket.

Figure 6A:
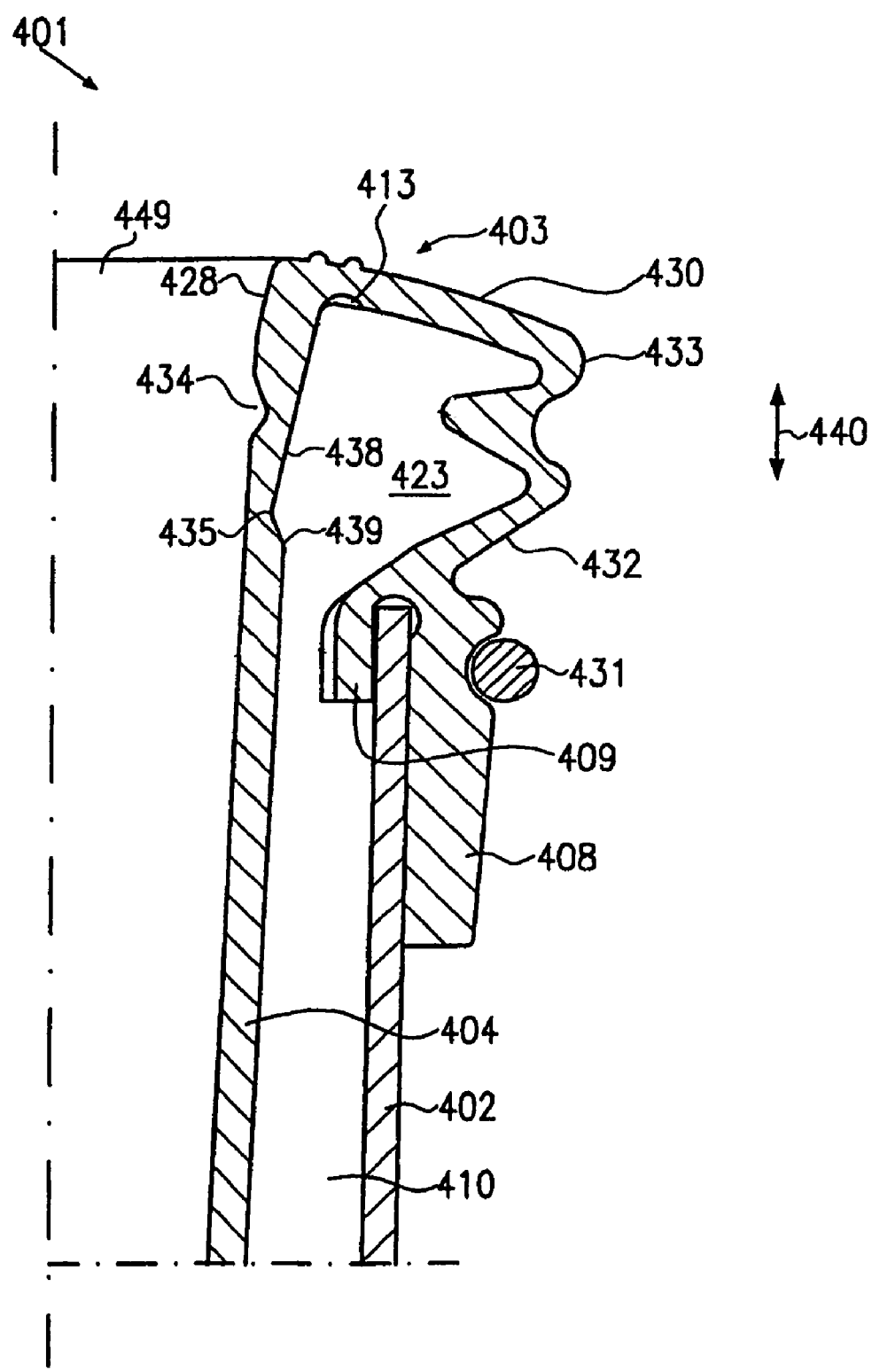
FIG. 6a shows a sectional view of a special embodiment of the present invention provided with an external pre-stressing element, the cross-section of the insertion opening being here variable through a displaceable ring.

FIG. 6a shows another enlargement of the pulsation chamber 410, 423 in the head part 403 of he teat rubber 401. The enlarged boundary 428 is connected to the sealing lip 430 via the movable connection 413. The movable connection 413 can be realized by an indentation/portion of reduced material thickness or by a special treatment of the material, e.g. by special plasticizers. Portions of reduced thickness 432, 433, 434 and 435 in the teat rubber wall allow controlled collapse of the head part 403 of the teat rubber 401 when a vacuum is applied to the pulsation chamber 423. Horizontal and vertical forces can thus be applied to the teat. In the embodiment shown in FIG. 6a, the wall section 438 will fold inwards and the wall section 428 outwards so that, on the whole, only a movement in the vertical direction (indicated by the arrow 440) will occur in the operating condition. However, also movements and consequently forces in the horizontal direction can be generated by a suitable arrangement of the portions of reduced thickness 434 and 435.

The diameter of the insertion opening 449 can be varied by means of a pre-stressing element 431, 431a, which can be a rubber ring or some other annular resilient element, so that the teat rubber 401 can be adapted to various teat sizes. FIG. 6a shows the pre-stressing element at a first position, at which the insertion opening has an enlarged cross-section, so that the teat can be introduced more easily.

Figure 6B:
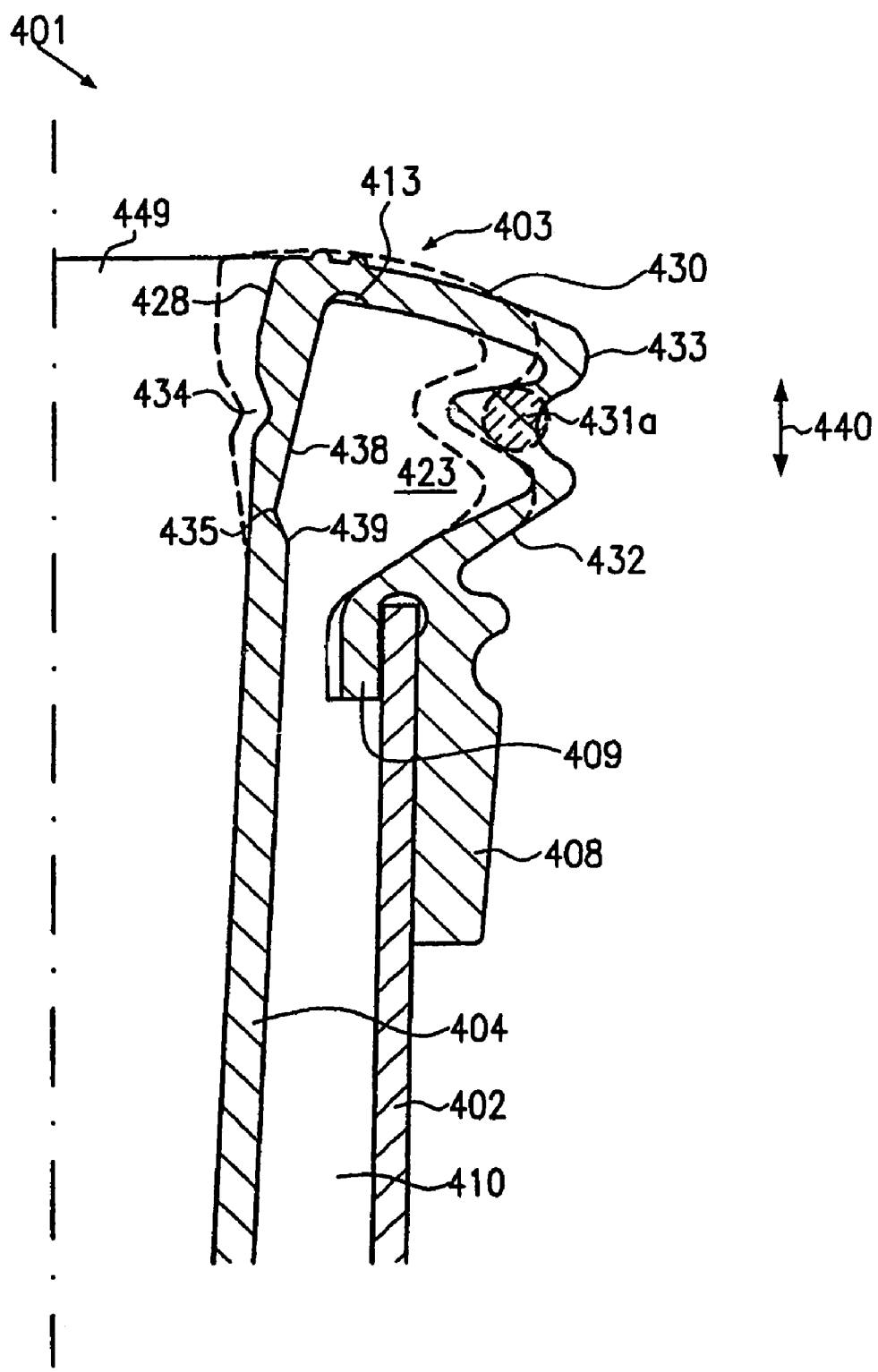
FIG. 6b shows the pre-stressing element according to FIG. 6a at a second position, at which the cross-section of the insertion opening is reduced in size

FIG. 6b shows the pre-stressing element 431a of the embodiment of FIG. 6a at a second position, at which the insertion opening 449 has a narrowed cross-section, so that the adhesion to the teat and the leak tightness will be improved. The broken line illustrates the direction in which the planar teat bearing section 428 will move, when the pre-stressing element 431 is displaced to the second position.

The pre-stressing element, which is shown in FIGS. 6a and 6b, can also be implemented in the form described in connection with FIGS. 7a and 7b.

Figure 6C:
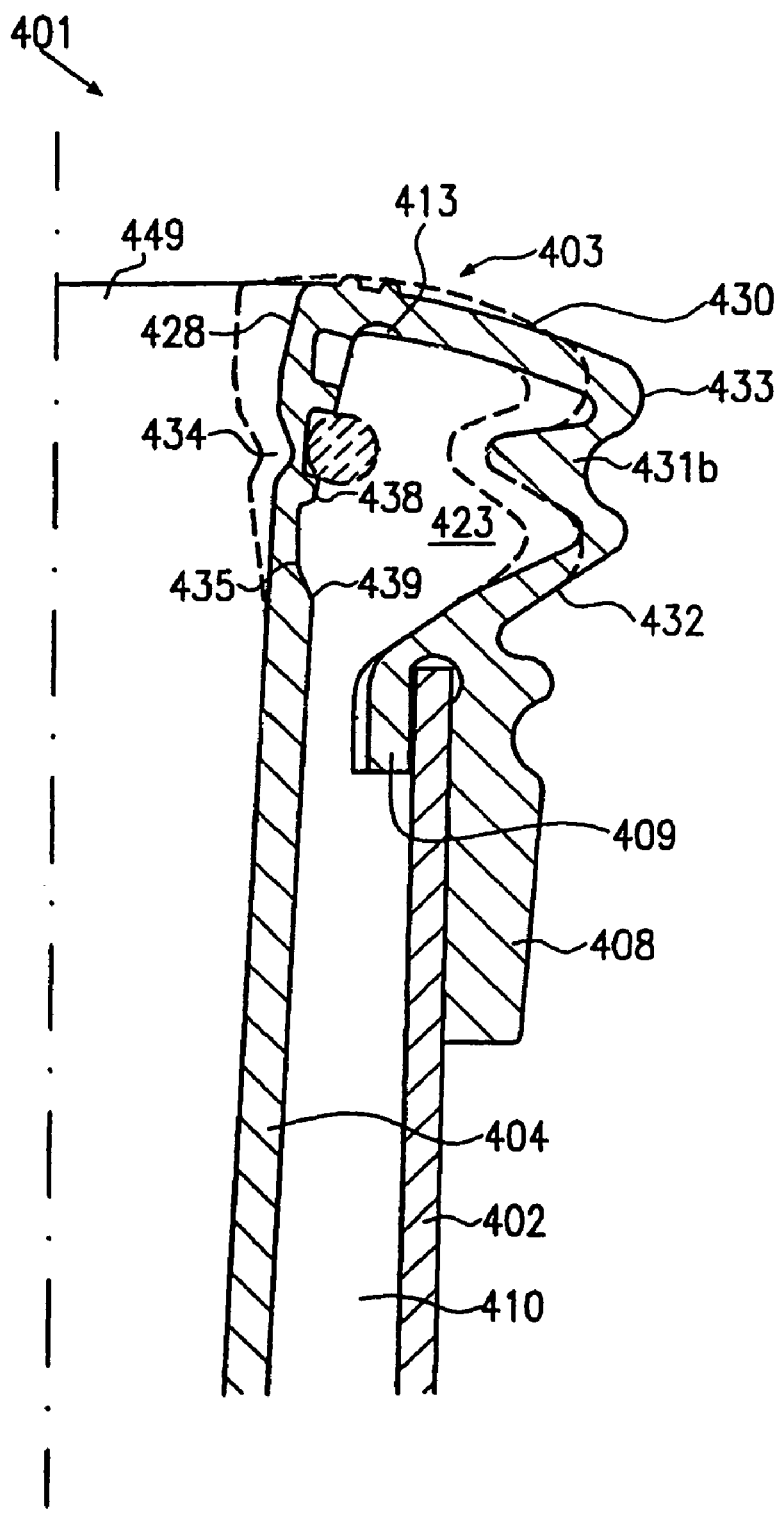
FIG. 6c shows the embodiment according to FIGS. 6a and 6b with the pre-stressing element provided on the inner side.

FIG. 6c shows an alternative arrangement of the pre-stressing element 431b on the inner side of the cavity 423. The broken line illustrates once more the direction in which the planar teat bearing section 428 will move, when the pre-stressing element 431 is in a state of reduced cross-section, as described in connection with FIG. 7b.

Furthermore, as has already been described in FIG. 2, the teat bearing areas can be cushioned (not shown in FIGS. 6a, 6b and 6c) in the embodiments that have already been described.

Figure 7:
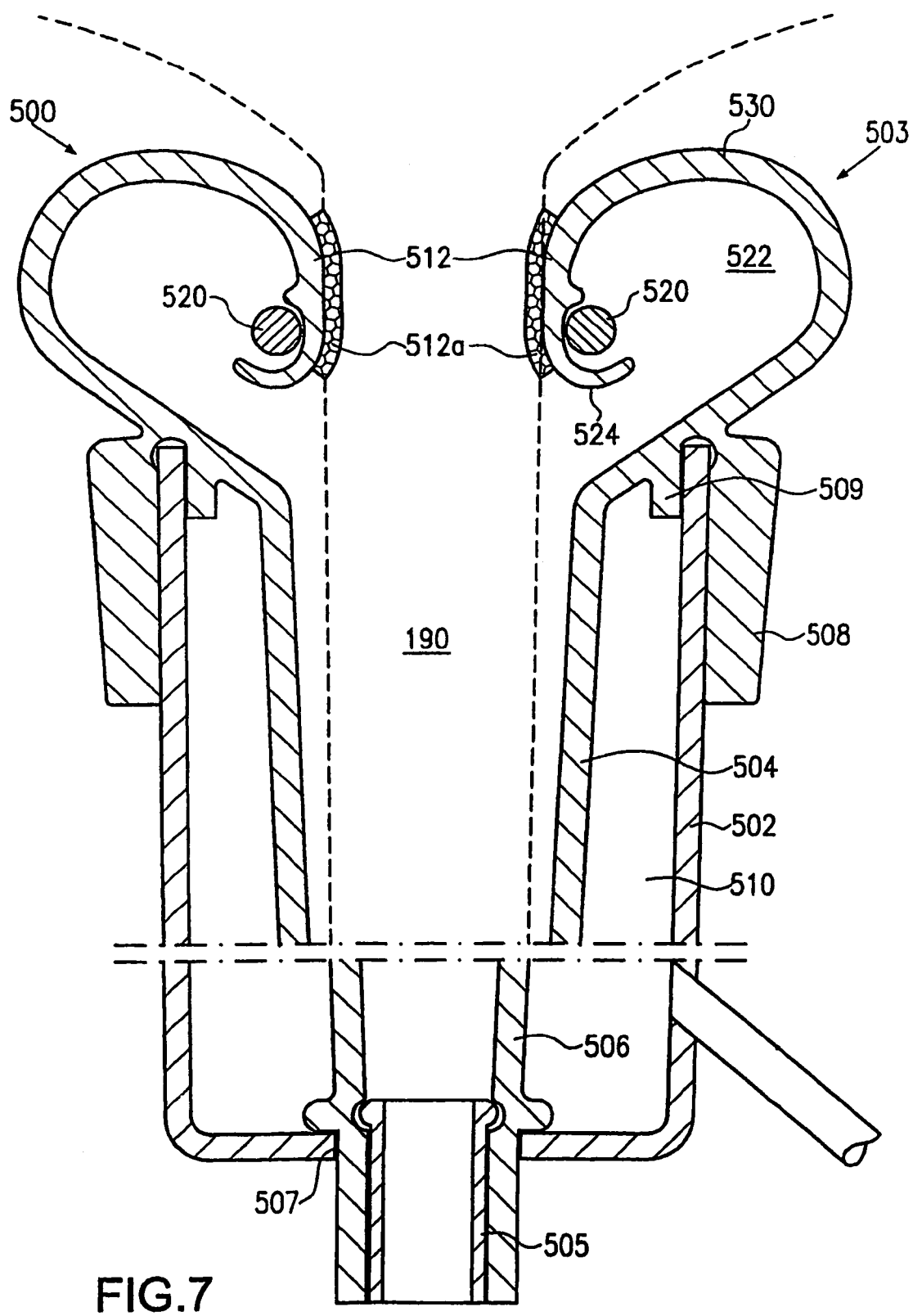
FIG. 7 shows a sectional view of a special embodiment of the present invention with the pre-stressing element provided on the inner side.

FIG. 7 shows an embodiment in which the pre-stressing element is arranged in the form of an annular element 520 on an inner wall of the cavity 522 in the head part 503 of the teat rubber 500. First and second projections, which are directed towards the cavity 522, position the annular pre-stressing element 520.

Furthermore, as has already been described in FIG. 2, the teat bearing areas 512a can be cushioned in the embodiments that have already been described.

Figure 7A:
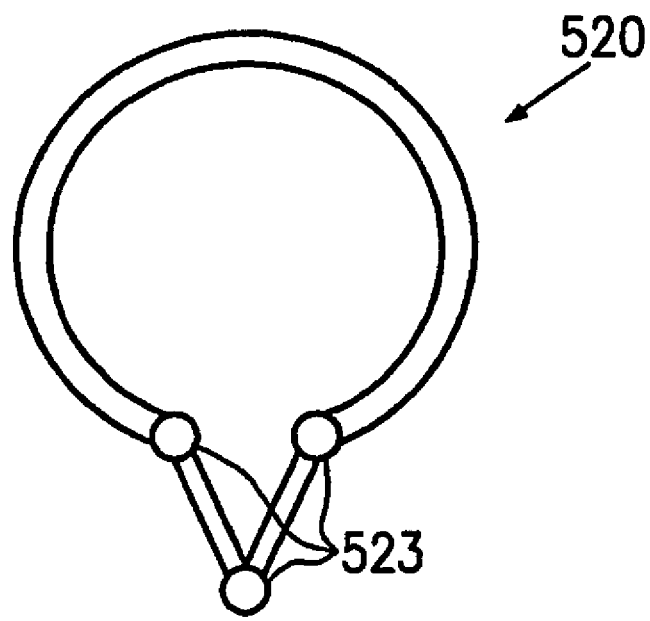
FIG. 7a shows an embodiment of the pre-stressing element in a folded condition.
Figure 7B:
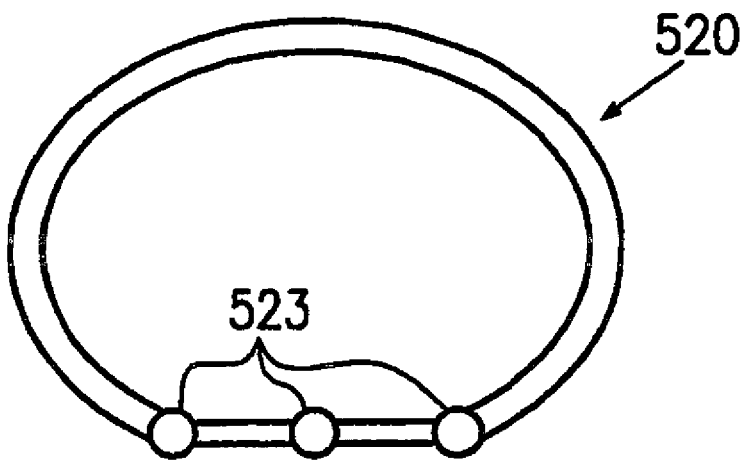
FIG. 7b shows the embodiment according to FIG. 7a in an unfolded condition.

FIGS. 7a and 7b show an embodiment of the annular pre-stressing element 520. The annular element 520 is here provided with a folding mechanism by means of which the annular element 520 can be changed over between two cross-sections. The folding mechanism comprises hinge portions 523 so that a subarea of the annular element 520 can change between a folded and an unfolded condition, when pressure is applied to the annular element 520 in the radial direction. Making use of this embodiment of the annular element, it is possible to simultaneously hold the milking cup and change the radius of the annular element with one hand. FIG. 7a shows the embodiment of the pre-stressing element 520 in a folded condition, and FIG. 7b shows the embodiment of FIG. 7a in an unfolded condition.

Figure 8:
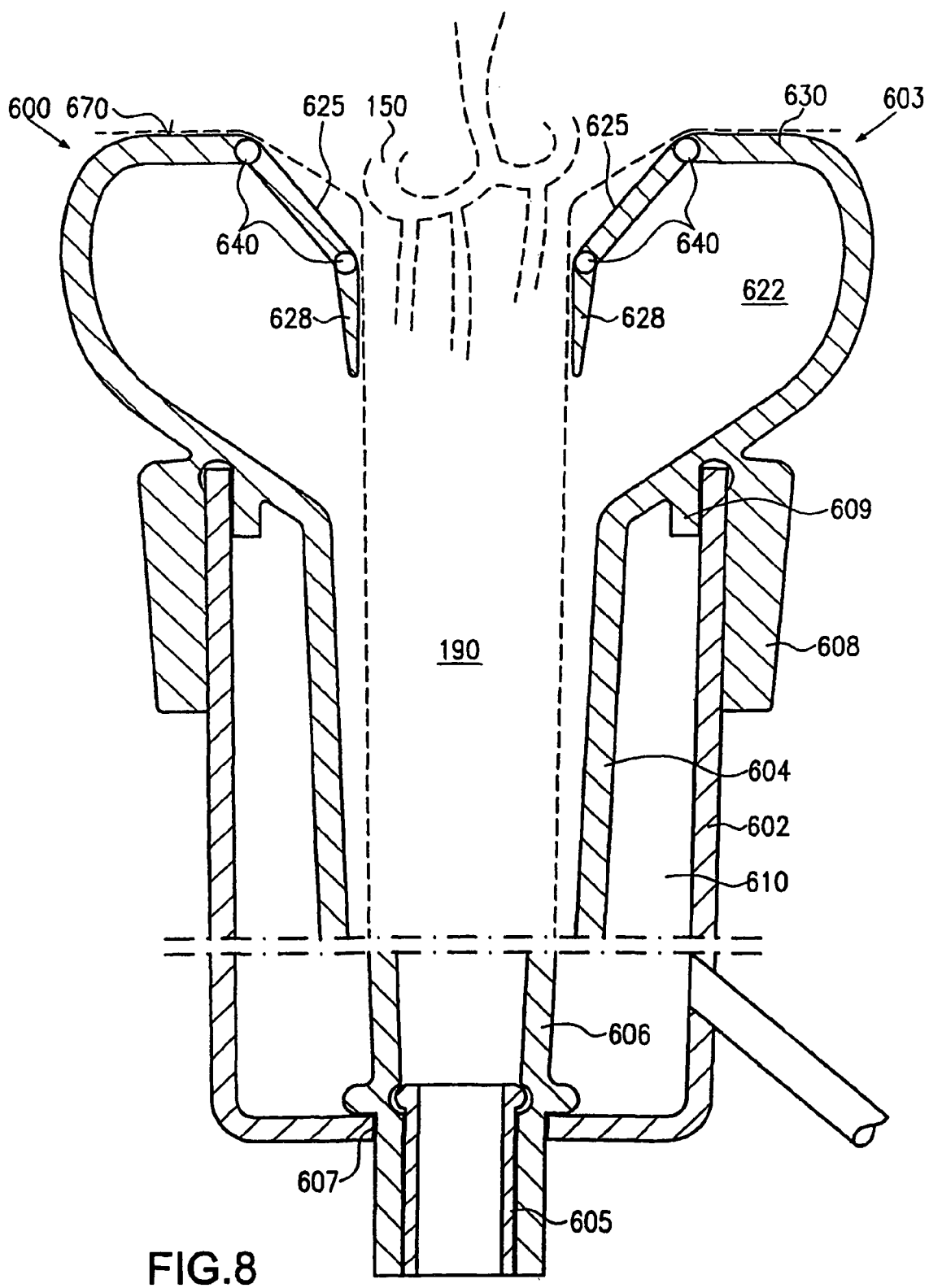
FIG. 8 shows an embodiment of the teat rubber with an optimum opening for the inner annular fold.

FIG. 8 shows an embodiment in the case of which a part of the insertion opening tapers conically towards the inner side of the teat rubber in such a way that the inner annular fold (Fuerstenberg'sche Venenring) 150 located on the base of the teat cannot come into contact with the teat rubber 600, the planar teat bearing area 628 and the sealing lip 630, and that pressure cannot be applied thereto, not even if the milking cup should shift in the direction of the udder. In the present example, the boundary of a wide opening of the conically tapering insertion opening is followed by an udder bearing surface 670 by means of which the teat 190 and parts of the udder with the inner annular fold 150 can be prevented from being drawn into the teat rubber by a milking vacuum, when the udder shrinks during the milking process, so that said inner annular fold 150 cannot enter the narrow, pressure-exerting area of the teat rubber, in particular the planar teat bearing area. The example shown in FIG. 8 shows a conically tapering surface 625 which, when seen in a cross-sectional view, extends linearly. Other cross-sectional shapes, such as concave surfaces or convex surfaces, can, however, be used as well.

Furthermore, a transition 640 between the conically tapering surface 625 and the planar teat bearing section 628 and the udder bearing surface 670, respectively, can be implemented in a hingelike manner. The hinges 640 will intensify an effect of the conically tapering surface in the case of which the lower edges of the planar teat bearing section 628 move towards the teat 190, when the teat rubber 600 slips inadvertently downwards and off the teat 190. The insertion opening will thus become narrower and the adhesion between the teat rubber 600 and the teat 190 will improve. The hingelike transition 640 between the conically tapering surface 625 and the planar teat bearing section 628 and the udder bearing surface 670, respectively, can comprise a portion of reduced material thickness, an indentation or a variation of the material properties in comparison with the adjoining material. The transition will thus assume hingelike properties.

For the sake of completeness, it should be stated that, as has already been described in FIG. 2, the teat bearing areas can be cushioned (not shown in FIG. 8) in the embodiments that have already been described.

The invention claimed is:

1. A teat rubber for use on a milking cup of a milking apparatus, comprising:
    a head part having provided thereon a sealing lip that forms an insertion opening for a teat, a part of the insertion opening conically tapering towards an inner side of the teat rubber in such a way that an inner fold located on the base of the teat cannot come into contact with the teat rubber and that pressure cannot be applied thereto;
    a holding edge for grasping a milking cup sleeve;
    a suction connecting piece connected to the head part; and
    a planar teat bearing section formed on the sealing lip and defining the insertion opening,
    characterized in that,
    when seen in a cross-sectional view; a conically tapering surface of the conically tapering insertion opening is linear,
    transitions between the conically tapering surface and a planar teat bearing section, as well as between the conically tapering surface and an udder bearing surface, respectively function as hinges and
    the transitions comprise one of a portion of reduced material thickness, an indentation and a variation of the material properties in comparison with the properties of the adjoining material.

2. A teat rubber according to claim 1, wherein the transition comprises a portion of reduced material thickness.

3. A teat rubber according to claim 1, wherein the transition comprises an indentation.

4. A teat rubber according to claim 1, wherein the transition comprises a variation of material properties with respect adjoining material.

5. A teat rubber according to claim 1, characterized in that at least one of at least a part of the planar teat bearing section and inner surfaces of a suction connecting piece have cushioned surfaces.

6. A teat rubber according to claim 5, characterized in that the cushioned surface consists of a foamed elastomer.

7. A teat rubber according to claim 6, characterized in that the foamed elastomer is a foam silicone.

8. A teat rubber according to claim 6, characterized in that the foamed elastomer is sprayed to form the cushioned surface.

9. A teat rubber according to claim 6, characterized in that at least one of a whole planar teat bearing section and the suction connecting piece consist of the foamed elastomer.

10. A teat rubber according to claim 5, characterized in that the cushioned surfaces are implemented as cushioned pockets.

11. A teat rubber according to claim 10, characterized in that the cushioned surfaces are a replaceable insert.

12. A teat rubber according to claim 5, characterized in that the cushioned surfaces are a fluid-filled pad.

13. A teat rubber according to claim 12, characterized in that the cushioned surfaces are a replaceable insert.

* * * * *